United States Patent
Zhao et al.

(10) Patent No.: US 9,609,321 B2
(45) Date of Patent: Mar. 28, 2017

(54) CONDITIONAL CONCEALMENT OF LOST VIDEO DATA

(71) Applicant: Microsoft Technology Licensing, LLC, Redmond, WA (US)

(72) Inventors: David Yuheng Zhao, Enebyberg (SE); Sergei Nikiforov, Stockholm (SE); Konrad Hofbauer, Stockholm (SE); Magnus Hemmendorff, Stockholm (SE); Pontus Carlsson, Bromma (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 13/803,738

(22) Filed: Mar. 14, 2013

(65) Prior Publication Data
US 2014/0211860 A1     Jul. 31, 2014

(30) Foreign Application Priority Data
Jan. 28, 2013   (GB) .................................. 1301449.3

(51) Int. Cl.
| | | |
|---|---|---|
| H04N 19/00 | (2014.01) | |
| H04N 19/89 | (2014.01) | |
| H04N 19/172 | (2014.01) | |
| H04N 19/46 | (2014.01) | |
| H04N 19/127 | (2014.01) | |
| H04N 19/154 | (2014.01) | |

(Continued)

(52) U.S. Cl.
CPC ..... *H04N 19/00939* (2013.01); *H04N 19/127* (2014.11); *H04N 19/154* (2014.11); *H04N 19/167* (2014.11); *H04N 19/172* (2014.11); *H04N 19/46* (2014.11); *H04N 19/895* (2014.11); *H04N 19/503* (2014.11)

(58) Field of Classification Search
CPC ........ H04N 7/50; H04N 7/68; H04N 7/26244; H04N 7/26271; H04N 7/26941
USPC .................. 375/240, 240.01, 240.26, 240.27
See application file for complete search history.

(56) References Cited

U.S. PATENT DOCUMENTS

| | | |
|---|---|---|
| 7,038,710 B2 | 5/2006 | Caviedes |
| 7,039,117 B2 | 5/2006 | Chan |

(Continued)

FOREIGN PATENT DOCUMENTS

| | | |
|---|---|---|
| CN | 1669322 | 9/2005 |
| EP | 1467568 | 3/2004 |

(Continued)

OTHER PUBLICATIONS

"Foreign Notice of Allowance", EP Application No. 11799454.1, Jan. 19, 2015, 6 pages.

(Continued)

*Primary Examiner* — Mohammed Rahaman
*Assistant Examiner* — Jimmy S Lee (57) ABSTRACT

A receiving apparatus comprises a receiver for receiving a video signal, an output for outputting the video signal to a screen, storage device or further terminal; and a concealment module for applying a concealment algorithm to a lost area of the video signal. The concealment module is configured to determine an estimate of concealment quality selectively directed toward a region of interest within the area in question, and based on this estimate to determine whether or not to apply the concealment algorithm.

20 Claims, 4 Drawing Sheets

(51) Int. Cl.
H04N 19/167 (2014.01)
H04N 19/895 (2014.01)
H04N 19/503 (2014.01)

(56) References Cited

U.S. PATENT DOCUMENTS

| | | | |
|---|---|---|---|
| 7,466,755 B2 | 12/2008 | Chen et al. | |
| 8,155,213 B2 | 4/2012 | Huang et al. | |
| 8,254,438 B2 | 8/2012 | Davis | |
| 9,237,289 B2 | 1/2016 | Carlsson et al. | |
| 2001/0026630 A1 | 10/2001 | Honda | |
| 2003/0056168 A1 | 3/2003 | Krishnamachari | |
| 2004/0139462 A1 | 7/2004 | Hannuksela et al. | |
| 2004/0151244 A1* | 8/2004 | Kim | H04N 19/70 375/240.03 |
| 2005/0031219 A1 | 2/2005 | Puri et al. | |
| 2005/0157799 A1 | 7/2005 | Raman et al. | |
| 2007/0237098 A1 | 10/2007 | Wang | |
| 2008/0062322 A1 | 3/2008 | Dey et al. | |
| 2008/0080623 A1* | 4/2008 | Kim | H04N 19/895 375/240.27 |
| 2008/0088743 A1 | 4/2008 | Zhu et al. | |
| 2008/0247469 A1 | 10/2008 | Vadapalli et al. | |
| 2008/0285651 A1 | 11/2008 | Au et al. | |
| 2009/0003461 A1 | 1/2009 | Kwon et al. | |
| 2009/0041114 A1 | 2/2009 | Clark | |
| 2009/0086826 A1* | 4/2009 | May | H04N 21/23424 375/240.27 |
| 2009/0153668 A1 | 6/2009 | Kim et al. | |
| 2010/0002771 A1 | 1/2010 | Huang et al. | |
| 2010/0011274 A1 | 1/2010 | Stockhammer et al. | |
| 2010/0091841 A1 | 4/2010 | Ishtiaq et al. | |
| 2010/0275105 A1 | 10/2010 | Ouedraogo et al. | |
| 2010/0309985 A1 | 12/2010 | Liu et al. | |
| 2010/0322314 A1 | 12/2010 | Huang et al. | |
| 2011/0080952 A1 | 4/2011 | Vadapalli et al. | |
| 2012/0008832 A1* | 1/2012 | Wang | G06K 9/036 382/103 |
| 2012/0128071 A1 | 5/2012 | Celetto et al. | |
| 2012/0170658 A1* | 7/2012 | Anderson | H04N 19/895 375/240.16 |
| 2012/0189168 A1 | 7/2012 | El-Maleh et al. | |
| 2013/0016775 A1* | 1/2013 | Varodayan | H04N 19/107 375/240.05 |
| 2013/0114002 A1 | 5/2013 | Carlsson et al. | |
| 2013/0271668 A1 | 10/2013 | Argyropoulos et al. | |
| 2016/0088293 A1 | 3/2016 | Carlsson et al. | |

FOREIGN PATENT DOCUMENTS

| | | |
|---|---|---|
| EP | 2129136 | 12/2009 |
| EP | 2661894 | 11/2013 |
| WO | 03/041382 A2 | 5/2003 |
| WO | WO-2004008733 | 1/2004 |
| WO | WO-2005084035 | 9/2005 |
| WO | WO-2011134113 | 11/2011 |
| WO | WO-2012089678 | 7/2012 |

OTHER PUBLICATIONS

"Non-Final Office Action", U.S. Appl. No. 13/340,023, Jan. 27, 2015, 26 pages.
"Second Written Opinion", Application No. PCT/US2014/013451, Jan. 27, 2015, 7 Pages.
Belfiore, et al., "Concealment of Whole-Frame Losses for Wireless Low Bit-Rate Video Based on Multiframe Optical Flow Estimation", Retrieved at <<http://wr.lib.tsinghua.edu.cn/sites/default/files/1129682446471.pdf>>, IEEE Transactions on Multimedia, Apr. 2005, pp. 14.
Liu, et al., "Multiframe Error Concealment for Whole-Frame Loss in H.2641AVC", Retrieved at <<http://ieeexplore.ieee.org/stamp/stamp.jsp?arnumber=04380009>>, IEEE International Conference on Image Processing, Sep. 16, 2007, pp. 4.
Hadizadeh, et al., "Saliency-Cognizant Error Concealment in Loss-Corrupted Streaming Video", Retrieved at <<http://ieeexplore.ieee.org/stamp/stamp.jsp?tp=&arnumber=6298377>>, IEEE International Conference on Multimedia and Expo, Jul. 9, 2012, pp. 6.
Chen, et al., "Robust Video Region-of-interest Coding Based on Leaky Prediction", Retrieved at <<http://www.mcn.ece.ufl.edu/public/QianChen/csvt_review.pdf>>, IEEE Transactions on Circuits and Systems for Video Technology, Sep. 2009, pp. 8.
Wang, et al., "A Region and Data Hiding Based Error Concealment Scheme for Images", Retrieved at http://www.juew.org/publication/jue_errorconceal.pdf>>, IEEE Transactions on Consumer Electronics, May 2001, pp. 6.
"Combined Search & Examination Report", (Apr. 24, 2013),12 pages.
"International Search Report and Written Opinion", Application No. PCT/EP2011/073986, (Mar. 8, 2012), 14 Pages.
Agrafiotis, Dimitris et al., "Optimized Temporal Error Concealment through Performance Evaluation of Multiple Concealment Features", *Centre for Communications Research*, Dept. of Electrical & Electronic Eng., University of Bristol, (2006), pp. 211-212.
Girod, et al., "Feedback-Based Error Control for Mobile Video transmission", *Proceedings of the IEEE*, 87 (10), (Oct. 1999), 17 Pages.
Wang, et al., "Error Control and Concealment for Video Communication: A Review", *Proceedings of the IEEE*, 86(5), (May 1998), 24 Pages.
Yamada, Toru et al., "No-Reference Video Quality Estimation Based on Error-Concealment Effectiveness", *IEEE*, 2007, (2007), 6 pages.
"Non-Final Office Action", U.S. Appl. No. 13/659,573, Sep. 16, 2014, 12 pages.
"Search Report", GB Application No. 1301449.3, Aug. 18, 2014, 4 pages.
"International Search Report & Written Opinion for PCT Patent Application No. PCT/US2014/013451", Mailed Date: Apr. 22, 2014, Filed Date: Jan. 28, 2014, 10 Pages.
"Final Office Action", U.S. Appl. No. 13/659,573, May 4, 2015, 10 pages.
"Foreign Office Action", GB Application No. 1118406.6, Apr. 15, 2015, 4 pages.
"Foreign Office Action", EP Application No. 15162615.7, Mar. 30, 2016, 4 pages.
"Non-Final Office Action", U.S. Appl. No. 13/340,023, Jun. 3, 2016, 21 pages.
"Supplemental Notice of Allowance", U.S. Appl. No. 13/659,573, Nov. 6, 2015, 2 pages.
"Final Office Action", U.S. Appl. No. 13/340,023, Sep. 8, 2015, 23 pages.
"Foreign Office Action", CN Application No. 201180063561.0, Jul. 22, 2015, 12 pages.
"Notice of Allowance", U.S. Appl. No. 13/659,573, Aug. 13, 2015, 4 pages.
"Final Office Action", U.S. Appl. No. 13/340,023, Jan. 6, 2017, 25 pages.
"Foreign Office Action", EP Application No. 15162615.7, Nov. 2, 2016, 4 pages.

* cited by examiner

CONDITIONAL CONCEALMENT OF LOST VIDEO DATA

RELATED APPLICATION

This application claims priority under 35 USC 119 or 365 to Great Britain Application No. 1301449.3 filed Jan. 28, 2013, the disclosure of which is incorporate in its entirety.

BACKGROUND

In modern communications systems a video signal may be sent from one terminal to another over a medium such as a wired and/or wireless network, often a packet-based network such as the Internet. Typically the frames of the video are encoded by an encoder at the transmitting terminal in order to compress them for transmission over the network. The encoding for a given frame may comprise intra frame encoding whereby blocks are encoded relative to other blocks in the same frame. In this case a block is encoded in terms of a difference (the residual) between that block and a neighbouring block. Alternatively the encoding for some frames may comprise inter frame encoding whereby blocks in the target frame are encoded relative to corresponding portions in a preceding frame, typically based on motion prediction. In this case a block is encoded in terms of a motion vector identifying an offset between the block and the corresponding portion from which it is to be predicted, and a difference (the residual) between the block and the corresponding portion from which it is predicted. A corresponding decoder at the receiver decodes the frames of the received video signal based on the appropriate type of prediction, in order to decompress them for output to a screen.

However, frames or parts of frames may be lost in transmission. For instance, typically packet-based networks do not guarantee delivery of all packets, e.g. one or more of the packets may be dropped at an intermediate router due to congestion. As another example, data may be corrupted due to poor conditions of the network medium, e.g. noise or interference. Forward error correction (FEC) or other such coding techniques can sometimes be used to recover lost packets, based on redundant information included in the encoded bitstream. However, if certain packets are still not recovered after FEC then the lost parts of the signal cannot be decoded at the decoder.

To accommodate this, it is known to provide a concealment algorithm at the decoder side, to conceal patches of lost data within a current frame. A concealment algorithm works by extrapolating or interpolating a replacement for the lost data from information that has been successfully received and decoded—either by extrapolating the replacement data from a preceding, received frame; or extrapolating replacement data from another, received part of the same frame; or by interpolating between received parts of the same frame. That is, typically concealment operates on decoded data (images, motion vectors) and tries to reconstruct the same type of data. An alternative to applying a concealment algorithm is simply to discard the current frame and instead freeze the preceding frame until a subsequent usable frame is received and decoding can recommence. Sometimes concealment provides better quality than just freezing the previous frame, but other times not. E.g. the concealment may result in visible artefacts that are perceptually worse than just freezing.

SUMMARY

In the following there is provided a way of determining when to apply concealment and when not. The determination can be made dynamically during operation, e.g. on a frame-by-frame basis. To do this, the determination is based on an estimation of the quality that would be obtained if concealment was applied across an area lost from the received signal, such as a lost frame.

According to embodiments disclosed herein, a receiving apparatus comprises a receiver for receiving a video signal, an output for outputting the video signal to a screen, and a concealment module for applying a concealment algorithm to an area of the video signal having lost data. For example the video signal may comprise a plurality of frames, and the area to be potentially concealed may be a lost frame. The concealment module determines an estimate of concealment quality that is selectively directed toward a region of interest within the area in question. That is, the estimate is directed to a particular region smaller than the area having lost data—either in that the estimate is only based on the region of interest, or in that the estimate is at least biased towards that region. Based on such an estimate, the concealment module determines whether or not to apply the concealment algorithm. In one or more embodiments, the concealment module may use this estimate to make a concealment decision for the whole area under consideration, which includes both the region of interest upon which the estimate was made and a further region outside the region of interest. That is, the estimate may be directed to a particular region of interest smaller than the area for which the concealment decision is to be made. E.g. a single decision may be made as to whether to conceal various patches across a whole lost frame, but based on an estimate of concealment quality that is directed to a smaller region of interest within the frame.

By way of illustration, in one exemplary implementation a live video call may be established between a terminal of a first user and a terminal of a second user over a packet-based network. As part of the call, the terminal of the first user may receive, in encoded form, a live video stream comprising a plurality of frames representing the second user. Code running on the first (receiving) user's terminal may be used to decode the received frames of the video stream, to output the video stream to a screen, and also to conditionally apply a concealment algorithm to a target frame of the video stream containing lost data, wherein when applied the concealment algorithm projects lost data of the target frame from a previous received, decoded frame. The conditional application of the concealment algorithm may comprise determining, within the area of the target frame, a region of interest comprising at least a part of the second user's face. An estimate of concealment quality is then determined, selectively directed towards the region of interest; and, based on this estimate, a decision may be made once for the whole target frame as to whether or not to apply the concealment algorithm. When the concealment algorithm is not applied, instead a preceding frame may be frozen for a duration corresponding to the target frame.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

DETAILED DESCRIPTION

A concealment quality estimation may be used to estimate the quality of a concealed frame, e.g. by estimating the peak signal to noise ratio (PSNR) for the concealed frame. If the quality estimate is good enough, concealment is applied. Otherwise the receiving terminal just freezes the last frame.

However, in a communication scenario, the face is often of greatest importance, relative to the background or other objects. In determining whether to display a concealed frame or not, if the concealment quality estimation just estimates the quality of the full frame without taking content into account, then this can result in a concealed frame being displayed even though the face area contains major artefacts. Conversely, a potential concealed frame may be discarded even though the face has good quality while only the background contains artefacts. Hence there is a potential problem in that concealed frames which could be beneficial to display are sometimes not displayed, while concealed frames that are not beneficial to display sometimes do end up being displayed.

In embodiments disclosed herein, a region of interest (ROI) or perceptual importance map is transmitted to a receiving terminal to guide concealment quality estimation. Alternatively, face-detection may be run at the receiver side to extract the region of interest, or the ROI could be indicated by some means by the user, e.g. where the eyes are focusing or by pointing on a touch screen One way to use the region of interest would be to select whether to conceal individual blocks or macroblocks, depending on whether they are located in the region of interest. That is, to only apply concealment to blocks or macroblocks if they are within the region of interest (and concealment quality would be good enough). However, that may introduce more complexity than is necessarily desirable.

Therefore in embodiments, the region of interest is used to inform a yes/no decision that applies for the whole frame. The quality estimation is targeted in a prejudicial fashion on the region of interest to decide whether to apply concealment or not, but once that decision has been made it is applied for the whole frame, potentially including other regions such as the background. That is, while concealment may always be applied locally, to repair lost patches, in embodiments it is determined how much can be patched locally before the entire frame should be discarded. I.e. while only those individual patches where data is lost are concealed, the decision about concealment is applied once per frame on a frame-by-frame basis. In one such embodiment, the concealed version of the image is displayed if the face regions are good enough. If the face region is degraded too much using concealment, it may be better to instead discard the entire frame.

In some embodiments, the concealment may additionally comprise means to attenuate artefacts outside the ROI in case that region contains severe artefacts. This could for example include blurring or adding noise to the corrupt regions.

Figure 1:
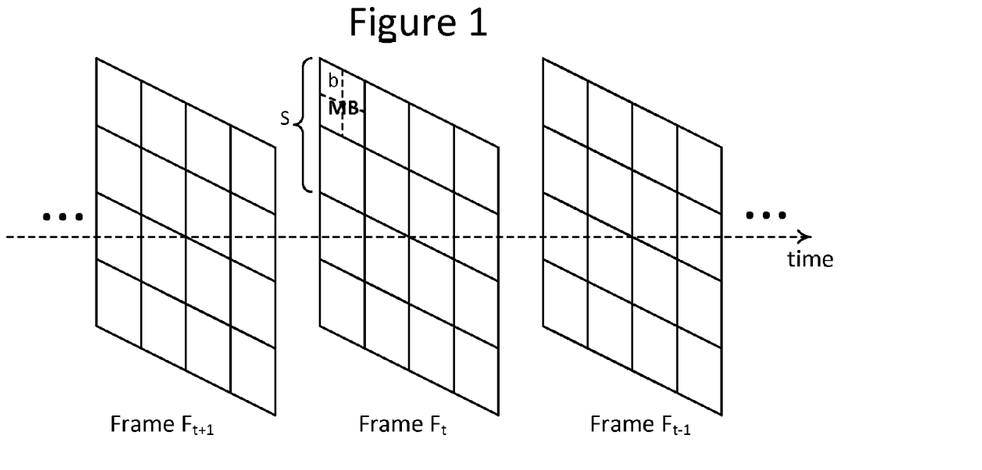
FIG. 1 is a schematic representation of a video stream.

FIG. 1 gives a schematic illustration of an input video signal captured from a camera, and divided into portions ready to be encoded by a video encoder so as to generate an encoded bitstream. The signal comprises a moving video image divided in time into plurality of frames (F), each frame representing the image at a different respective moment in time ( . . . t−1, t, t+1 . . . ). Within each frame, the frame is divided in space into a plurality of portions each representing a plurality of pixels. The portions may for example be referred to as blocks. In certain schemes, the frame is divided and sub-divided into different levels of portion or block. For example each frame may be divided into macroblocks (MB) and each macroblock may be divided into blocks (b), e.g. each block representing a region of 8×8 pixels within a frame and each macroblock representing a region of 2×2 blocks (16×16 pixels). In certain schemes each frame can also be divided into slices (S), each comprising a plurality of macroblocks.

A block in the input signal may initially be represented in the spatial domain, where each channel is represented as a function of spatial position within the block, e.g. each of the luminance (Y) and chrominance (U,V) channels being a function of Cartesian coordinates x and y, Y(x,y), U(x,y) and V(x,y). In this representation, each block or portion is represented by a set of pixel values at different spatial coordinates, e.g. x and y coordinates, so that each channel of the colour space is represented in terms of a particular value at a particular location within the block, another value at another location within the block, and so forth.

The block may however be transformed into a transform domain representation as part of the encoding process, typically a spatial frequency domain representation (sometimes just referred to as the frequency domain). In the frequency domain the block is represented in terms of a system of frequency components representing the variation in each colour space channel across the block, e.g. the variation in each of the luminance Y and the two chrominances U and V across the block. Mathematically speaking, in the frequency domain each of the channels (each of the luminance and two chrominance channels or such like) is represented as a function of spatial frequency, having the dimension of 1/length in a given direction. For example this could be denoted by wavenumbers $k_x$ and $k_y$ in the horizontal and vertical directions respectively, so that the channels may be expressed as $Y(k_x, k_y)$, $U(k_x, k_y)$ and $V(k_x, k_y)$ respectively. The block is therefore transformed to a set of coefficients which may be considered to represent the amplitudes of different spatial frequency terms which make up the block. Possibilities for such transforms include the Discrete Cosine transform (DCT), Karhunen-Loeve Transform (KLT), or others.

Figure 2:
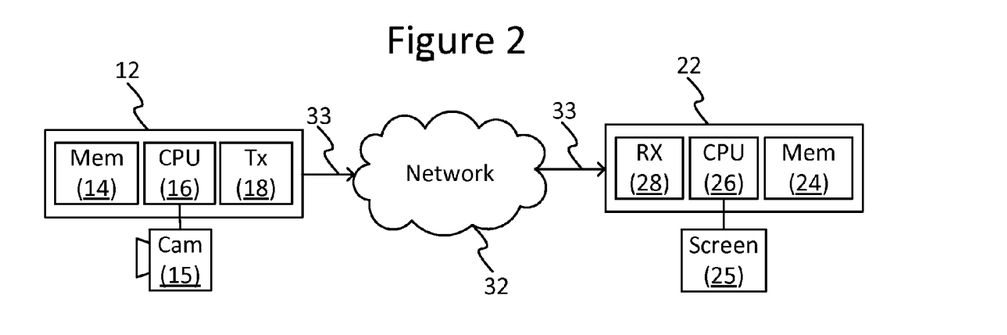
FIG. 2 is a schematic block diagram of a communication system.

An example communication system in which various embodiments may be employed is illustrated schematically in the block diagram of FIG. 2. The communication system comprises a first, transmitting terminal 12 and a second, receiving terminal 22. For example, each terminal 12, 22 may comprise one of a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a computer-readable storage medium 14 such as a flash memory or other electronic memory, a magnetic storage device, and/or an optical storage device. The first terminal 12 also comprises a processing apparatus 16 in the form of a processor or CPU having one or more execution units; a transceiver such as a wired or wireless modem having at least a transmitter 18; and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a computer-readable storage medium 24 such as an electronic, magnetic, and/or an optical storage device; and a processing apparatus 26 in the form of a CPU having one or more execution units. The second terminal comprises a transceiver such as a wired or wireless modem having at least a receiver 28; and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage 24 on the second terminal 22 stores at least a video decoder arranged to be executed on its own processing apparatus 26. When executed the decoder receives the encoded video stream from the receiver 28 and decodes it for output to the screen 25. A generic term that may be used to refer to an encoder and/or decoder is a codec.

Figure 3:
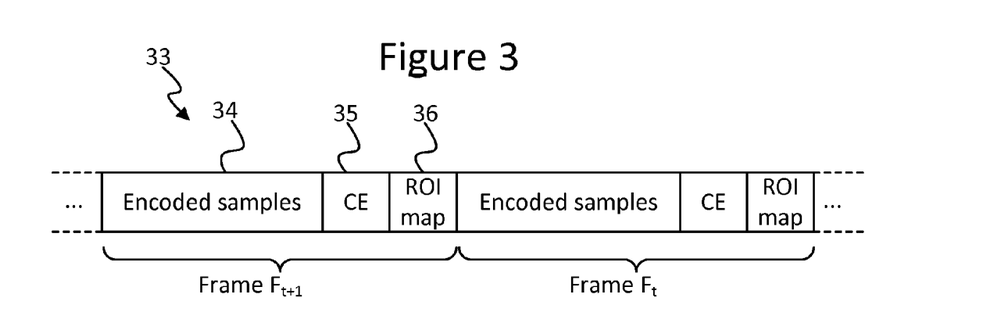
FIG. 3 is a schematic representation of an encoded video stream.

FIG. 3 gives a schematic representation of an encoded bitstream 33 as would be transmitted from the encoder running on the transmitting terminal 12 to the decoder running on the receiving terminal 22. The bitstream 33 comprises a plurality of encoded samples 34 for each frame, including any motion vectors. In one application, the bitstream may be transmitted as part of a live (real-time) video phone call such as a VoIP (Voice-over-Internet Protocol) call between the transmitting and receiving terminals 12, 22 (VoIP calls can also include video).

Figure 4:
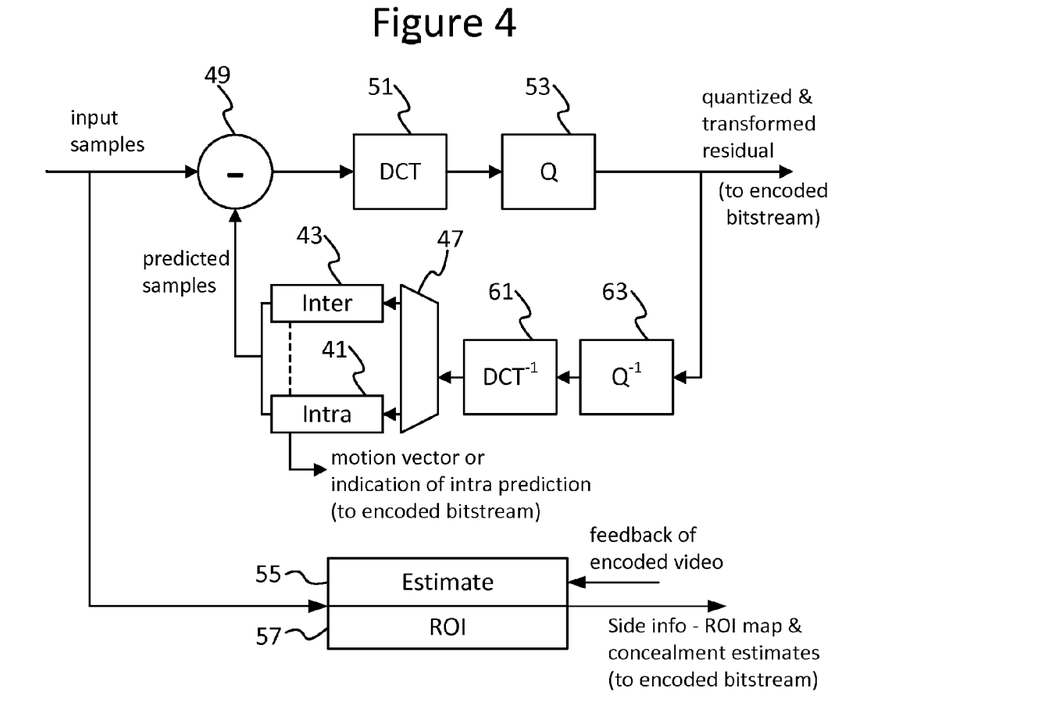
FIG. 4 is a schematic block diagram of an encoder.

FIG. 4 is a high-level block diagram schematically illustrating an encoder such as might be implemented on transmitting terminal 12. The encoder comprises: a discrete cosine transform (DCT) module 51, a quantizer 53, an inverse transform module 61, an inverse quantizer 63, an intra prediction module 41, an inter prediction module 43, a switch 47, and a subtraction stage (−) 49. In some embodiments, the encoder may also comprise a region of interest (ROI) identification module 57, and possibly a concealment quality estimation module 55. Each of these modules or stages may be implemented as a portion of code stored on the transmitting terminal's storage medium 14 and arranged for execution on its processing apparatus 16, though the possibility of some or all of these being wholly or partially implemented in dedicated hardware circuitry is not excluded.

The subtraction stage 49 is arranged to receive an instance of the input video signal comprising a plurality of blocks (b) over a plurality of frames (F). The input video stream is received from a camera 15 coupled to the input of the subtraction stage 49. The intra or inter prediction 41, 43 generates a predicted version of a current (target) block to be encoded based on a prediction from another, already-encoded block or other such portion. The predicted version is supplied to an input of the subtraction stage 49, where it is subtracted from the input signal (i.e. the actual signal) to produce a residual signal representing a difference between the predicted version of the block and the corresponding block in the actual input signal.

In intra prediction mode, the intra prediction 41 module generates a predicted version of the current (target) block to be encoded based on a prediction from another, already-encoded block in the same frame, typically a neighbouring block. When performing intra frame encoding, the idea is to only encode and transmit a measure of how a portion of image data within a frame differs from another portion within that same frame. That portion can then be predicted at the decoder (given some absolute data to begin with), and so it is only necessary to transmit the difference between the prediction and the actual data rather than the actual data itself. The difference signal is typically smaller in magnitude, so takes fewer bits to encode.

In inter prediction mode, the inter prediction module 43 generates a predicted version of the current (target) block to be encoded based on a prediction from another, already-encoded region in a different frame than the current block, offset by a motion vector predicted by the inter prediction module 43 (inter prediction may also be referred to as motion prediction). In this case, the inter prediction module 43 is switched into the feedback path by switch 47, in place of the intra frame prediction stage 41, and so a feedback loop is thus created between blocks of one frame and another in order to encode the inter frame relative to those of a preceding frame. This typically takes even fewer bits to encode than intra frame encoding.

The samples of the residual signal (comprising the residual blocks after the predictions are subtracted from the input signal) are output from the subtraction stage 49 through the transform (DCT) module 51 (or other suitable transformation) where their residual values are converted into the frequency domain, then to the quantizer 53 where the transformed values are converted to discrete quantization indices. The quantized, transformed indices of the residual as generated by the transform and quantization modules 51, 53, as well as an indication of the prediction used in the prediction modules 41, 43 and any motion vectors generated by the inter prediction module 43, are all output for inclusion in the encoded video stream 33 (see element 34 in FIG. 3); typically via a further, lossless encoding stage such as an entropy encoder (not shown) where the prediction values and transformed, quantized indices may be further compressed using lossless encoding techniques known in the art.

An instance of the quantized, transformed signal is also fed back though the inverse quantizer 63 and inverse transform module 61 to generate a predicted version of the block (as would be seen at the decoder) for use by the selected prediction module 41 or 43 in predicting a subsequent block to be encoded. Similarly, the current target block being encoded is predicted based on an inverse quantized and inverse transformed version of a previously encoded block. The switch 47 is arranged pass the output of the inverse quantizer 63 to the input of either the intra prediction module 41 or inter prediction module 43 as appropriate to the encoding used for the frame or block currently being encoded.

In some optional embodiments, a concealment quality estimation module 55 may be included at the encoder side, coupled to both the input and the output of the encoder, to receive both the raw (unencoded) input samples and feedback of the encoded signal. The concealment quality estimation module 55 comprises an instance of the decoder including its concealment module 75 (to be discussed shortly) which is arranged to produce a decoded version of the signal, enabling the encoder to see what the decoder would see. The concealment quality estimation module 55 is also configured to run one or more loss scenarios for each frame, e.g. for each target frame it determines what the corresponding concealment frame would look like if the target frame or a part of that frame was lost but the preceding frame was received, and the target frame was extrapolated from the preceding frame. Based on this, it compares the concealed version of the frame with the raw input samples, or with the decoded version of the frame, to produce an estimate of concealment quality for the target frame. As similar process may be run for other loss scenarios, though the more scenarios are considered the more processing burden this places on the encoder side.

The comparison applied at the concealment quality estimation module 55 may for example be based on an average error between the concealed versions of the samples and the decoded (or original) versions of the samples, such as a mean square error (MSE); or on a signal to noise based measure such as peak signal to noise ratio (PSNR). E.g. the mean-squared error (MSE) between two images g(x,y) and g'(x,y) may be calculated as:

$$e_{MSE} = \frac{1}{MN} \sum_{m=1}^{M} \sum_{n=1}^{N} [g'(n,m) - g(n,m)]^2.$$

Or peak signal to noise ratio (PSNR) scales the MSE according to the image range, e.g.:

$$R = -10 \log_{10} \frac{e_{MSE}}{A^2},$$

where A is the maximum pixel value and the PSNR is measured in decibels (dB). Other examples of difference measures that would be used include sum of square differences (SSD), sum of absolute differences (SAD), or a structural similarity index (SSIM).

The one or more concealment quality estimates 35 for the one or more loss scenarios for each of the frames are transmitted to the decoder on the receiving terminal 22, for example embedded in the encoded bitstream (e.g. being encoded along with the encoded samples at the entropy encoder stage). See FIG. 3. This provides one way by which the decoder at the receiving terminal 22 may determine an estimated effect of concealment if loss occurs.

However, note this encoder-side concealment quality estimation places a burden on the transmitting and bitstream (in terms of complexity and bitrate incurred), and this implementation is by no means necessary. As will be discussed in more detail below, in less complex embodiments the concealment quality is instead determined at the decoder side, e.g. taking motion into account, looking into the history of one or more past received and decoded frames, and/or looking in the present frame in regions adjacent to the lost region.

Turning to the ROI estimation, in embodiments an ROI identification module 57 is provided at the encoder side, coupled to receive an instance of the original, unencoded video from the input of the encoder. In this case the region of interest identification module 57 is configured to identify a region of interest in the video being encoded for transmission. In embodiments, this is done by applying a facial recognition algorithm, examples of which in themselves are known in the art. The facial recognition algorithm recognises a face in the video image to be encoded, and based on this identifies the region of the image comprising the face or at least some of the face (e.g. facial features like mouth and eyebrows) as the region of interest. The facial recognition algorithm may be configured specifically to recognise a human face, or may recognise faces of one or more other creatures. In other embodiments a region of interest may be identified on another basis than facial recognition. Other alternatives include other types of image recognition algorithm such as a motion recognition algorithm to identify a moving object as the region of interest, or a user-defined region of interest specified by a user of the transmitting terminal 12.

Figure 6:
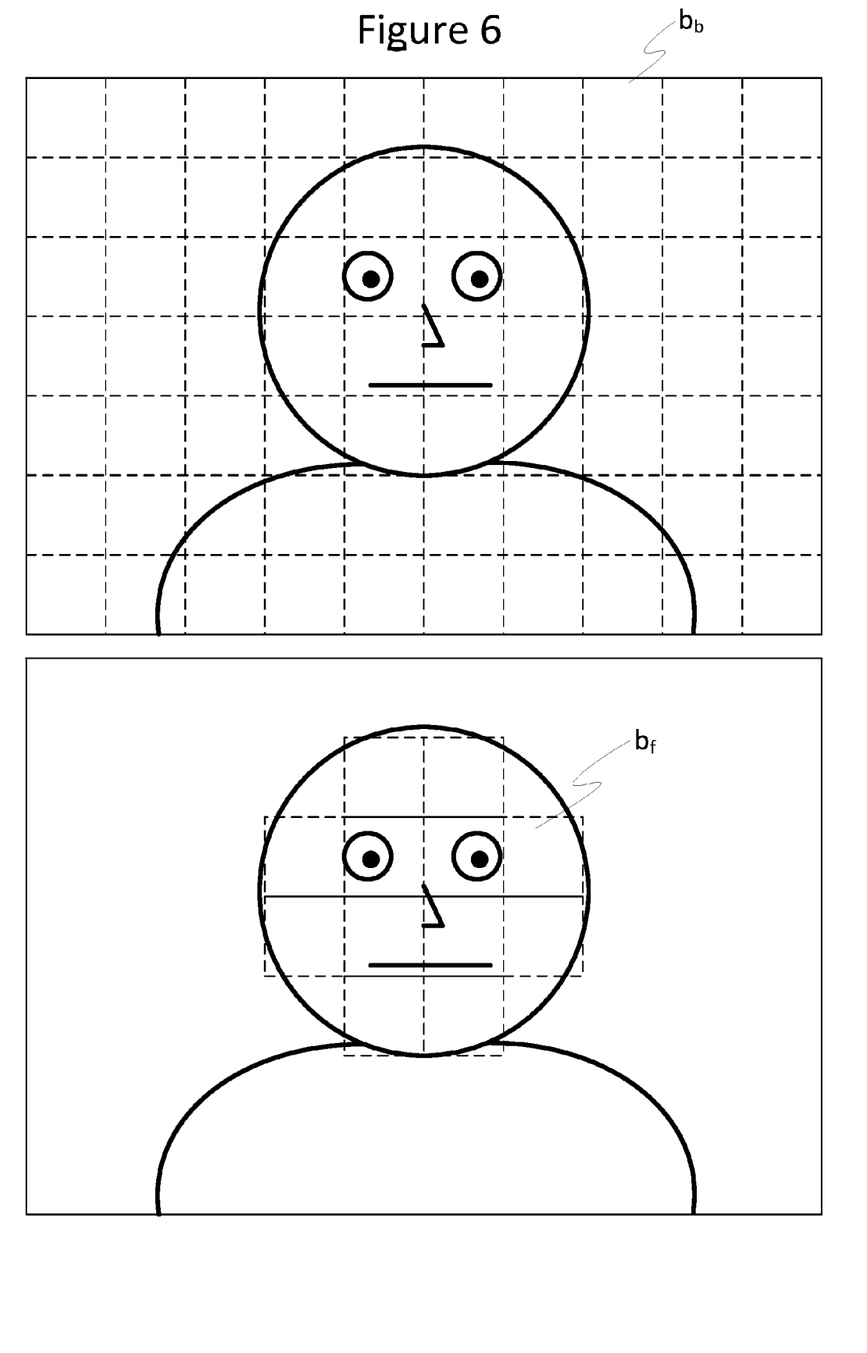
FIG. 6 is a schematic representation of a region of interest in a video image to be encoded.

An example is illustrated schematically in FIG. 6. The figure shows one frame of a "talking head" type video image, e.g. as would typically occur in a video call. The top illustration in FIG. 6 shows the frame divided into blocks (b) including background blocks ($b_b$). Note that the size of the blocks is exaggerated for illustrative purposes (relative to those of a typical video codec, though in general any size blocks can be used). The bottom illustration in FIG. 6 shows the same frame with only those blocks ($b_f$) which have been identified as forming the region of interest (facial or foreground blocks), e.g. any block that includes at least some of the face, or a selection of blocks which cover main features of the face. In embodiments, the ROI map 36 may indicate the blocks $b_f$ (e.g. by block index or coordinates) making up the region of interest, and/or those blocks ($b_b$) which are not included in the region of interest.

Whichever technique is used, the ROI identification module 57 outputs an indication 36 of the region of interest, which is transmitted to the decoder at the receiving terminal 22, e.g. embedded in the encoded bitstream (e.g. being encoded along with the encoded samples at the entropy encoder stage). See again FIG. 3. This provides one way by which the decoder at the receiving terminal 22 may determine the region of interest. In embodiments, this indication may take the form of a perceptual importance map identifying which portions of a frame form the region of interest, e.g. which blocks ($b_f$) or macroblocks. The ROI map 36 or other indication may be sent every frame or less than once per frame (in which case it is considered to represent the current ROI until the next map is sent).

In embodiments the ROI map 36 for a target frame (and/or any concealment estimates 35) may be sent in a separate packet than the one or more packets used to encode that frame, to reduce the probability that both the target frame and its concealment estimate(s) are lost due to packet loss (note that FIG. 3 is only schematic). However, this is not absolutely essential as information sent in a same packet may still guard against loss due to corruption in a part of the packet, or loss of another part of the same frame sent in another packet.

In embodiments that do use a concealment quality estimation module 55 at the encoder side and a ROI identification module 57 at the encoder side, the concealment quality estimation module 55 may base its comparison only on the samples in the identified region of interest, e.g. only the samples of those blocks or macroblocks making up the region of interest. For example the compared samples g(x,y) and g'(x,y) in the above calculation for MSE or PSNR are only those samples within the region of interest. Alternatively, the concealment quality estimation module 55 may base its comparison on all the samples in the frame (or a wider range of samples than the region of interest) but with a greater weighting being applied to the samples within the region of interest. For example the compared samples g(x,y) and g'(x,y) in the above calculation for MSE or PSNR may comprise all the samples in the frame, but in the sum each term may be weighted by a factor $w_{n,m}$ which gives a greater significance to those samples inside the region of interest than those outside of it. E.g. $w_{n,m}$ could have one predetermined value (say 1) for samples in the region of interest and another predetermined value (say 0.5) for samples outside that region.

Figure 5:
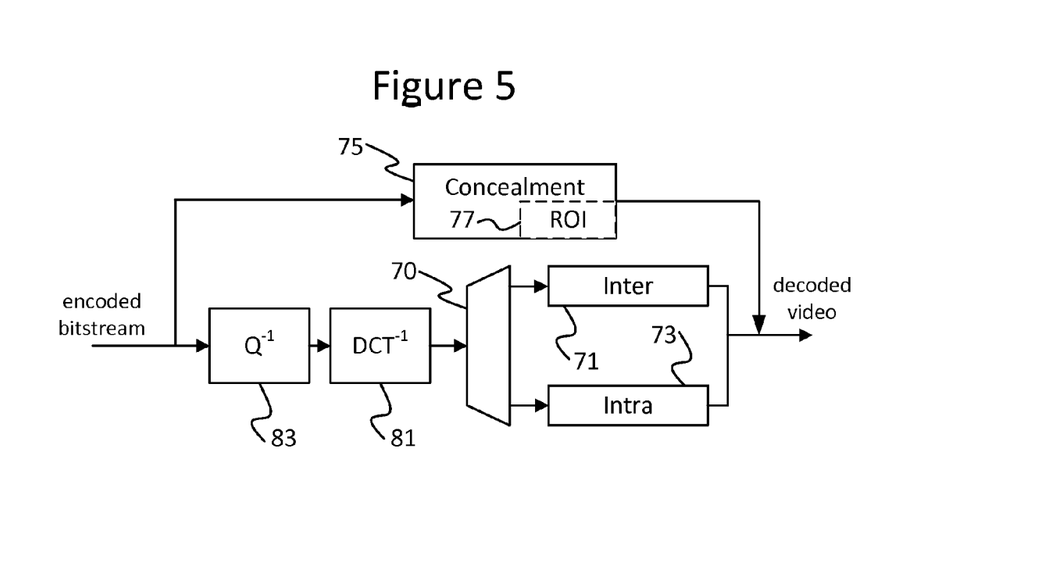
FIG. 5 is a schematic block diagram of a decoder.

FIG. 5 is a high-level block diagram schematically illustrating a decoder such as might be implemented on receiving terminal 22. The decoder comprises an inverse quantization stage 83, an inverse DCT transform stage 81, a switch 70, and an intra prediction stage 71 and a motion compensation stage 73. The decoder also comprises a concealment module 75 comprising a region of interest (ROI) processing module 77. Each of these modules or stages may be implemented as a portion of code stored on the receiving terminal's storage medium 24 and arranged for execution on its processing apparatus 26, though the possibility of some or all of these being wholly or partially implemented in dedicated hardware circuitry is not excluded.

The inverse quantizer 81 is arranged to receive the encoded signal 33 from the encoder, via the receiver 28. The inverse quantizer 81 converts the quantization indices in the encoded signal into de-quantized samples of the residual signal (comprising the residual blocks) and passes the de-quantized samples to the reverse DCT module 81 where they are transformed back from the frequency domain to the spatial domain. The switch 70 then passes the de-quantized, spatial domain residual samples to the intra or inter prediction module 71 or 73 as appropriate to the prediction mode used for the current frame or block being decoded, where intra or inter prediction respectively is used to decode the blocks (using the indication of the prediction and/or any motion vectors received in the encoded bitstream 33 as appropriate). The output of the DCT module 51 (or other suitable transformation) is a transformed residual signal comprising a plurality of transformed blocks for each frame. The decoded blocks are output to the screen 25 at the receiving terminal 22.

The concealment module 75 is coupled to so as to have visibility of the incoming bitstream 33 from the receiver 28. In event that a frame or part of a frame is lost (e.g. due to packet loss or corruption of data), the concealment module 75 detects this and selects whether to apply a concealment algorithm. If the concealment algorithm is applied, this works either by projecting a replacement for lost patches of a frame (or even a whole lost frame) from a preceding, received frame; or projects a replacement for a lost patches of a frame from one or more other, received parts of the same frame. That is, either by extrapolating a lost frame or lost part of a frame from a preceding, received frame; or extrapolating a lost part of a frame from another, received part of the same frame; or estimating a lost part of a frame by interpolating between received parts of the same frame. Details of concealment algorithms in themselves are known in the art. In embodiments, the concealment algorithm is configured to work on a whole frame basis, so if patches of the target frame are lost, the concealment algorithm projects a replacement version of the lost patches from any part of that whole frame from a previous, received frame—e.g. the last successfully received frame. Further, the decision as to whether to conceal or not is made for the frame as a whole, i.e. any lost patches across the whole frame are concealed or otherwise the whole frame is not concealed. If not concealed, then instead the last received, successfully decoded frame is frozen for a duration of the target frame containing the loss.

The ROI processing module 77 is configured to identify a region of interest in the incoming video image. In embodiments, it does this using the ROI map 36 received from the transmitting terminal 12, e.g. extracting it from the incoming bitstream 33. For example, the ROI processing module 77 is thereby able to determine which blocks ($b_i$) or macroblocks make up the region of interest. In alternative embodiments, the ROI identification module 57 at the encoder side may not be needed, and any of the techniques described above for identifying a region of interest may instead be applied at the decoder side at the receiving terminal 22. For example the facial recognition algorithm or other image recognition algorithm may be applied in the ROI processing module 77 of the decoder at the receiving terminal 22, or a user-defined region of interest may be specified by a user of the receiving terminal 22. In the case of an image recognition algorithm such as a facial recognition algorithm applied at the decoder side, this will be based on a previously received, successfully decoded frame, on the assumption that in most cases the region of interest is unlikely to have moved significantly from one frame to the next.

Further, the concealment module 75 is configured to determine an estimate of concealment quality for the lost frame or part of the frame. The concealment quality provides an estimate of the quality of a concealed version of the lost area if concealed using the concealment algorithm.

In some embodiments the concealment module 75 could determine the concealment quality using speculative estimate 35 received from the transmitting terminal 12 (which were based on the simulated loss scenarios), e.g. extracting it from the encoded bitstream 33. However in the following embodiments, an encoder side concealment quality estimation module 55 is not needed, and instead the concealment quality estimation is performed by the concealment module 75 at the decoder side. In this case, as there is no knowledge of the actual lost data at the decoder, the concealment quality instead has to be estimated "blindly" based on successfully received parts of the target frame and/or one or more previously received frames.

In embodiments, the decoder-side module 75 may look at parts of the present frame adjacent to the lost patch(es) in order to estimate concealment quality. For example this technique can be used to enable the concealment quality estimation module 75 to predict the PSNR of the concealed frame at the decoder side. The estimation of quality may be based on an analysis of the difference between received pixels adjacent to a concealed block (that is, pixels surrounding the concealed block in the current, target frame frame) and the corresponding adjacent pixels of the concealed block's reference block (that is, pixels surrounding the reference block in a reference frame of the video signal). The difference may be measured to provide a difference measure (or "difference metric") which may be stored for each block. An example is discussed in relation to FIG. 7.

Figure 7:
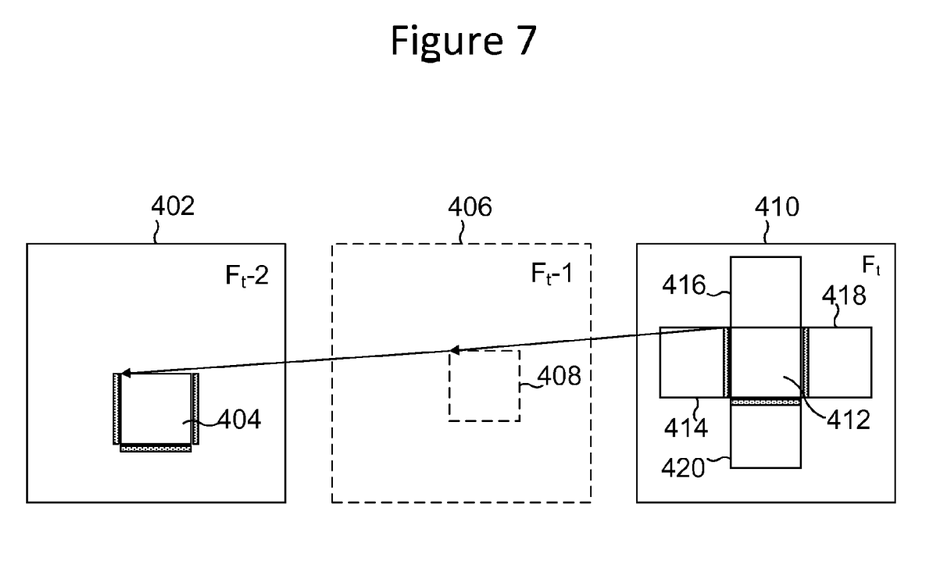
FIG. 7 is a schematic representation of an example technique for estimating concealment quality.

FIG. 7 shows three consecutive frames of a video signal which are received at the receiving terminal 12. The three frames are frame $F_{t-2}$ (402) whose position in the sequence of frames of the video signal is t−2, frame $F_{t-1}$ (406) whose position in the sequence of frames of the video signal is t−1, and frame $F_t$ (410) whose position in the sequence of frames of the video signal is t. The block 412 of frame $F_t$ is coded with reference to portion 408 of the frame $F_{t-1}$ as shown in FIG. 7. However, during transmission of the video signal from the transmitting terminal 12 to the receiving terminal 22 the portion 408 of the frame $F_{t-1}$ has been lost (e.g. due to packet loss or corruption), such that the block 412 of frame $F_t$ cannot be decoded using the portion 408.

The motion vector of the block 412 of the frame $F_t$ is extrapolated back to frame $F_{t-2}$ which precedes frame $F_{t-1}$. As shown in FIG. 7 the motion vector of the block 412 is extrapolated to a section 404 of the frame $F_{t-2}$. The portion 404 of the frame $F_{t-2}$ has been correctly received and decoded at the receiving terminal 22. Therefore the portion 404 can be used to provide a concealed block for use in the frame $F_t$ to replace the block 412. For example, the concealed block may be a copy of the pixels from the portion 404 of the frame $F_{t-2}$, but offset by the extrapolated motion vector.

The quality of concealment for frame $F_t$ is determined by analysing the error concealment for blocks in the region of interest. A measure is determined of the success of the error concealment provided by the concealed block replacing the block 412 in the frame $F_t$. The measure comprises a measure of the difference between at least some of the pixels surrounding the block 412 in the frame $F_t$ and the corresponding pixels surrounding the portion 404 of the frame $F_{t-2}$. A high value of the difference measure indicates that the difference is large. Equivalently, the difference measure may be implemented in some embodiments as a similarity measure wherein a high value of the similarity measure indicates that the difference is small (i.e. that the similarity is high). The determination is based on an estimation of the difference between pixels in the frame $F_t$ adjacent to the block 412 and corresponding pixels adjacent to the portion 404 in the reference frame $F_{t-2}$. The difference measure may be implemented as a function of the differences. For example, in various embodiments, the difference measure is implemented as a sum of absolute differences (SAD), sum of squared differences (SSD) or a mean square error (MSE). E.g. the mean square error between two corresponding groups of pixels g(x,y) and g'(x,y) may be calculated as:

$$e_{MSE} = \frac{1}{MN} \sum_{m=1}^{M} \sum_{n=1}^{N} [g'(n, m) - g(n, m)]^2.$$

In FIG. 7 the pixels which are compared are shaded. At least some of the pixels surrounding the block 412 are used and the corresponding pixels surrounding the section 404 are also used. For example, as shown in FIG. 7, a column of pixels to the left of the block 412 and adjacent to the block 412, a column of pixels to the right of the block 412 and adjacent to the block 412, and a row of pixels below the block 412 and adjacent to the block 412 are compared with a corresponding column of pixels to the left of the section 404 and adjacent to the portion 404, a column of pixels to the right of the section 404 and adjacent to the portion 404, and a row of pixels below the section 404 and adjacent to the portion 404.

The surrounding pixels used in the estimate may or may not completely surround the block 412 (and the corresponding portion 404). If not for example, adjacent pixels in the frame $F_t$ may be excluded from the estimation if they are in a block (e.g. 416) estimated to have non-linear motion, beyond a threshold of linearity based on its motion vector over the last two or more frames. Or if the concealed block 412 is at the edge of a frame, there may simply be no adjacent block 416 above it to include in the estimate. Alternatively adjacent pixels may be included from all around the concealed block, to the left, right, above and below. E.g. in FIG. 7 the comparison may also include a row of pixels above the block 412 and adjacent to the block 412 being compared with a row of pixels above the section 404 and adjacent to the portion 404.

The surrounding pixels may be adjacent to the block 412 (and adjacent to the corresponding section 404), on the boundary of the block 412 (and on the boundary of the corresponding portion 404). The surrounding pixels may be one or more pixels deep from the edge of the block 412 (and from the edge of the corresponding portion 404).

In embodiments, the concealed block which is used to replace the block 412 in the frame $F_t$ is a copy of the pixels of the portion 404 of the frame $F_{t-2}$ (offset by the extrapolated motion vector). Since the frame $F_{t-2}$ is received correctly at the receiving terminal 22 it is assumed that there is little or no error in the pixels of the portion 404 and the surrounding pixels in the frame $F_{t-2}$. Therefore the boundary between the portion 404 and the surrounding pixels (which are shaded in FIG. 7) which are used in the comparison has a smooth transition (e.g. in terms of luminance or chrominance). Therefore in order for the concealed block in frame $F_t$ to have a smooth transition at the boundary between the concealed block and the surrounding pixels (which are shaded in FIG. 7) which are used in the comparison in step, the surrounding pixels in the frame $F_t$ will tend to be similar to the surrounding pixels in frame $F_{t-2}$. Therefore the measure of the difference between the surrounding pixels in the frames $F_t$ and $F_{t-2}$ which are shown shaded in FIG. 7 can provide a good indication as to the success of the error concealment provided by the concealed block. In various embodiments, the comparison involves determining an SAD, SSD or MSE between the values of the corresponding pixels. The values of the pixels may be, for example, luminance or chrominance values of the pixels. The determined difference value is assigned to the block 412.

It is also determined whether there are any other blocks in the region of interest in frame $F_t$ which are coded with reference to a lost section of a previous frame (e.g. a section of the lost frame $F_{t-1}$ or $F_{t-2}$) and which are to be considered in determining an estimate of the quality of the frame $F_t$. If it is determined that there are more concealed blocks in the frame $F_t$ to be considered then the method then repeats for the newly considered block. Once it is determined that there are no more concealed blocks of the frame $F_t$ which need to be considered in the estimation of the concealment quality, then the method continues by summing or averaging all the MSE (or SSD or SAD) values which have been assigned to the considered, concealed blocks of the frame $F_t$, to thereby provide an estimate of the quality of the region of interest.

The sum of the MSEs, SSDs or SADs may be used to determine a peak signal-to-noise ratio (PSNR). The larger the sum, average or PSNR (or the like), the lower the quality of the concealment.

Thus in embodiments it is possible to determine an estimate of concealment quality at the decoder side, without needing any explicit support for the estimate to be implemented at the encoder side any without any explicit side information transmitted in the bitstream 33.

In another such example, error concealment effectiveness may be evaluated at the decoder side using luminance discontinuity at the boundaries of error regions. If the luminance discontinuity is larger than a pre-determined threshold then error concealment is considered to be ineffective.

In yet another example, the concealment quality estimation may be based on a difference between two or more preceding, successfully received and decoded frames. For example, the MSE or PSNR may instead be calculated, in the region of interest, between two preceding, successfully received and decoded frames or parts of those frames. The difference between those two preceding frames may be taken as an estimate of the degree of change expected from the preceding frame to the current, target frame (that which is lost), on the assumption that the current frame would have probably continued to change by a similar degree if received. E.g. if there was a large average difference in the region of interest between the last two received frames (e.g. measured in terms of MSE or PSNR), it is likely that the current, target frame would have continued to exhibit this degree of difference and concealment will be poor. But if there was only a small average difference in the region of interest between the last two received frames, it is likely that the current, target frame would have continued not to be very different and concealment will be relatively good quality. As another alternative, it is possible to look at the motion vectors of a preceding frame. For example, if an average magnitude of the motion vectors in the region of interest are large, a lot of change is expected and concealment will likely be poor quality; but if the average magnitude of motion vector is small, not much change is expected and concealment will likely provide reasonably good quality. E.g. if the motion vectors indicate a motion that is greater than a threshold then error concealment may be considered ineffective.

By whatever technique the concealment quality is estimated, as discussed in relation to the encoder side estimation, the estimate of concealment quality is focused on the region of interest—either in that the difference measure (whether applied at encoder or decode side) is only based on samples, blocks or macroblocks in the region or interest, to the exclusion of those outside; or in that terms in the difference sum or average are weighted with a greater significance for samples, blocks or macroblocks in the region of interest, relative to those outside the region of interest. For example the selectivity could be implemented using a weighted scoring, i.e. by importance mask, or centre of importance.

So in the example of FIG. 6, the concealment quality estimate is made only based on (or is biased towards) the blocks $b_f$ covering the main facial region.

However the quality is estimated, the concealment module 75 is configured to make the selection as to whether or not to apply the concealment algorithm based on the concealment quality estimate for the region of interest. In embodiments, the concealment, module 75 is configured to apply a threshold to the concealment quality estimate. If the concealment quality estimate is good relative to a threshold (meets and/or is better than the threshold), the concealment module 75 selects to apply the concealment algorithm. If the concealment quality estimate is bad relative to a threshold (is worse than and/or not better than the threshold), the concealment module 75 selects not to apply the concealment algorithm. Instead it may freeze the preceding frame.

In embodiments, the selection is applied for the whole area under consideration, e.g. the whole frame, even though the concealment quality estimate was only based on the smaller region of interest within that area (or at least biased towards the region of interest within that area), e.g. within a region of interest smaller than the area of the frame. That is to say, the estimate of concealment quality for the region of interest is used to decide whether or not to produce a concealed version the whole area, e.g. whole frame, including both the region of interest and the remaining region of that area outside the region of interest, e.g. the rest of the frame—the concealment algorithm concealing patches both inside and outside the region of interest. So in the example of FIG. 6, the concealment quality estimate may be made only based on (or biased towards) the blocks $b_f$ covering the main facial region, but may be used to make a concealment decision that is considered relevant for the whole frame including any blocks lost from amongst the foreground blocks $b_f$ and any blocks lost from amongst the background blocks $b_b$. This may provide a less complex solution than would be required to make a block-by-block decision for individual blocks, while still obtaining the benefit of ROI-based concealment. For example, it often does not matter to a user if the background contains concealment artefacts, so it may not be worthwhile selecting individually how to treat those blocks.

It will be appreciated that the above embodiments have been described only by way of example.

For instance, although above embodiments have been described in terms of whole frame concealment, this doesn't have to be the case. Instead the idea could be applied to another area of a frame, such as a slice. E.g. the decision about concealment may be made based on a region of interest within a slice, smaller than the slice, and once made the decision may be applied across the whole slice. Further, while the above has been described in terms of blocks and macroblocks, the region of interest does not have to be mapped or defined in terms of the blocks or macroblocks of any particular standard. In embodiments the region of interest may be mapped or defined in terms of any portion or portions of the frame, even down to a pixel-by-pixel level, and the portions used to define the region of interest do not have to be same as the divisions used for other encoding/decoding operations such as prediction (though in embodiments they may well be).

Further, loss is not limited to packet dropping, but could also refer for example to any loss due to corruption. In this case some data may be received but not in a usable form, i.e. not all the intended data is received, meaning that information is lost. Further, various embodiments are not limited to an application in which the encoded video is transmitted over a network. For example in another application, receiving may also refer to receiving the video from a storage device such as an optical disk, hard drive or other magnetic storage, or "flash" memory stick or other electronic memory. In this case the video may be transferred by storing the video on the storage medium at the transmitting device, removing the storage medium and physically transporting it to be connected to the receiving device where it is retrieved. Alternatively the receiving device may have previously stored the video itself at local storage. Even when the terminal is to receive the encoded video from storage medium such as a hard drive, optical disc, memory stick or the like, stored data may still become corrupted over time, resulting in loss of information.

Further, the decoder and/or concealment software does not necessarily have to be implemented at an end user terminal, nor output the video for immediate consumption at the receiving terminal. In alternative implementations, the receiving terminal may be a server running the decoder and/or concealment software, for outputting video to another terminal in decoded and/or concealed form, or storing the decoded and/or concealed video for later consumption. In another alternative, the concealment may take the form of a plugin to a viewer, that can be downloaded separately from the decoder.

In embodiments, the ROI map does not have to be embedded in the transmitted bitstream. In other embodiments it could be sent separately over the network 32 or another network. E.g. the ROI information could be in-band (embedded in video bitstream), or out-of band (transmitted on higher level protocol level). Alternatively as discussed, in yet further embodiments the ROI may be determined at the decoder side instead of the encoder side. Similarly in embodiments, the concealment estimates do not have to be embedded in the transmitted bitstream, but in other embodiments could be sent separately over the network 32 of other network, or may be determined at the decoder side. Modes of operation of the system covered by the disclosure herein include (but are not limited to):
transfer of ROI;
transfer importance map;
receiver runs face detection algorithm on previous frame; or
receiver derives importance map from quantization parameters (QP)—apply an interpolation where QP is not fixed, e.g. using motion vectors to transfer importance from one frame to another. A less complex alternative is to treat skipped macroblocks as less important.

Further, the disclosure is not limited to the use of any particular concealment algorithm and various suitable concealment algorithms in themselves will be known to a person skilled in the art. The terms "project", "extrapolate" or "interpolate" used above are not intended to limit to any specific mathematical operation. Generally the concealment may use any operation for attempting to regenerate a replacement for lost data by projecting from other, received image data that is nearby in space and/or time (as opposed to just freezing past data).

Further, where it is said that the measure of concealment quality is selectively directed to the region of interest, this can include the possibility of a weighted estimate based on both the region of interest an another region but biased towards the region of interest. It does not just limit to a strict inclusion or exclusion of different regions in the quality estimate. I.e. this covers any measure that looks at least prejudicially towards the quality in the region of interest.

The techniques disclosed herein can be implemented as an intrinsic part of an encoder or decoder, e.g. incorporated as an update to an existing standard such as H.264 or H.265, or can be implemented as an add-on to an existing standard such as an add-on to H.264 or H.265. Further, the scope of the disclosure is not restricted specifically to any particular representation of video samples whether in terms of RGB, YUV or otherwise. Nor is the scope limited to any particular quantization, nor to a DCT transform. E.g. an alternative transform such as a Karhunen-LoeveTransform (KLT) could be used, or no transform may be used. Further, the disclosure is not limited to VoIP communications or communications over any particular kind of network, but could be used in any network capable of communicating digital data, or in a system for storing encoded data on a storage medium.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A receiving apparatus comprising:
a hardware receiver for receiving a video signal;
an output device for outputting the video signal to one or more of a screen, storage device or further terminal; and
a concealment module stored on one or more computer-readable storage memories and configured to be executable to apply a concealment algorithm to an area of said video signal having lost data, the concealment module being configured to determine an estimate of concealment quality selectively directed toward a region of interest within said area, the estimate based at least in part on a measure of difference between corresponding pixels in different frames of the video signal that surround a block at least on three sides, the block representing the region of interest in each of the different frames, the estimate excluding pixels on a side of the block different than the at least three sides responsive to determining that the excluded pixels are in another block having non-linear motion beyond a threshold of linearity, the concealment module configured to determine whether or not to apply the concealment algorithm based on said estimate.

2. The apparatus of claim 1, wherein the concealment module is configured, based on said estimate directed to the region of interest, to make said determination about whether or not to apply the concealment algorithm for the whole of said area, so as when applied to conceal data lost from the region of interest and data lost from a further region outside the region of interest.

3. The apparatus of claim 2, wherein the video signal comprises a plurality of frames, and said area comprises a whole frame, the concealment module making said determination about whether or not to apply the concealment algorithm once for the whole frame based on said estimate of concealment quality for the region of interest within that frame.

4. The apparatus of claim 1, wherein said region of interest comprises an image of at least part of a face.

5. The apparatus of claim 1, wherein the video signal comprises a live video stream.

6. The apparatus of claim 5, wherein the video stream is received as part of a live video call.

7. The apparatus of claim 1, wherein the concealment module is configured to determine the region of interest by receiving an indication of the region of interest received from a terminal transmitting the video signal.

8. The apparatus of claim 7, wherein said indication comprises a region-of-interest map received from the transmitting terminal.

9. The apparatus of claim 1, wherein the concealment module is configured to determine the region of interest by applying an image recognition algorithm at the receiving apparatus.

10. Apparatus of claim 9, wherein said image recognition algorithm comprises a facial recognition algorithm.

11. The apparatus of claim 2, wherein the concealment module is configured to determine said estimate of concealment quality only based on the region of interest, and to determine whether or not to apply the concealment algorithm over said area without taking into account concealment quality for the further region.

12. The apparatus of claim 2, wherein the concealment module is configured to determine said estimate of concealment quality based on the region of interest and the further region, but weighted towards the region of interest.

13. The apparatus of claim 1, wherein the video signal comprises a plurality of frames, and the concealment algorithm is configured to conceal the area by projecting replacement data from a past received frame.

14. The apparatus of claim 1, wherein the video signal comprises a plurality of frames, and the concealment algorithm is configured to conceal the area by projecting replacement data from a received part of a same frame or interpolating between received parts of the same frame.

15. The apparatus of claim 1, wherein the video signal comprises a plurality of frames, and the concealment algorithm is configured so as, when the concealment algorithm is not applied, to instead freeze at least a part of a previous frame for a duration.

16. The apparatus of claim 1, wherein the video signal comprises a plurality of frames received in encoded form, and the apparatus comprises a decoder for decoding the received frames of the video signal for output to the screen.

17. The apparatus of claim 1, wherein the receiver is configured to receive the video signal from a transmitter over a packet-based network.

18. A system comprising:
one or more processors; and
one or more computer-readable storage memories comprising computer-readable instructions for processing a video signal comprising a plurality of frames, which, when executed by the one or more processors, implement a method comprising:
processing the video signal for output to a screen, storage device or further terminal; and
conditionally applying a concealment algorithm over an area of said video signal having lost data, the conditional application of the concealment algorithm comprising:
determining an estimate of concealment quality selectively directed towards a region of interest within said area, the estimate based at least in part on a measure of difference between corresponding pixels in different frames of the video signal that surround a block at least on three sides, the block representing the region of interest in each of the different frames, the estimate excluding pixels on a side of the block different than the at least three sides responsive to determining that the excluded pixels are in another block having non-linear motion beyond a threshold of linearity; and
determining whether or not to apply the concealment algorithm based on said estimate.

19. One or more computer-readable storage memories comprising computer-readable instructions which, when executed on a terminal of a first user implement a method comprising:
establishing a live video call with a terminal of a second user over a packet-based network, and as part of the call receiving, in encoded form, a live video stream comprising a plurality of frames representing the second user;
decoding the received frames of the video stream and outputting the video stream to a screen; and
conditionally applying a concealment algorithm to a target frame of said video stream having lost data, the concealment algorithm projecting a replacement for the lost data from a previous received, decoded frame, the conditional application of the concealment algorithm comprising determining within the frame a region of interest comprising an image of at least part of the second user's face, determining an estimate of concealment quality selectively directed towards said region of interest, the estimate based at least in part on a measure of difference between corresponding pixels in different frames comprising the video signal that surround a block at least on three sides, the block comprising the region of interest in each of the different frames, the estimate excluding pixels on a side of the block different than the at least three sides responsive to determining that the excluded pixels are in another block having non-linear motion beyond a threshold of linearity, and, based on said estimate, making a determination for the whole target frame as to whether or not to apply the concealment algorithm, so as when applied to conceal lost data from the region of interest and lost data from a region of the target frame outside the region of interest.

20. The one or more computer-readable storage memories of claim 19, wherein at least some of the pixels that surround the block are more than one pixel deep from an edge of the block.

\* \* \* \* \*